United States Patent [19]

Tagiri et al.

[11] Patent Number: 5,761,175
[45] Date of Patent: Jun. 2, 1998

[54] APPARATUS AND METHOD FOR REPRODUCING INFORMATION RECORED ON AN OPTICAL RECORDING MEDIUM ON WHICH PITS WITH $2^N$ DEPTHS ARE FORMED

[75] Inventors: Takao Tagiri, Ryuou; Takafumi Kamei, Kousay, both of Japan

[73] Assignee: Pioneer Electronic Corporation, Tokyo, Japan

[21] Appl. No.: 685,444

[22] Filed: Jul. 25, 1996

[30] Foreign Application Priority Data

Jul. 25, 1995 [JP] Japan .................................. 7-209184

[51] Int. Cl.$^6$ .................................................... G11B 7/095
[52] U.S. Cl. .................. 369/109; 369/275.1; 369/275.4; 369/124
[58] Field of Search ............................... 369/109, 275.1, 369/275.4, 124, 59

[56] References Cited

U.S. PATENT DOCUMENTS 5,144,552  9/1992  Abe ................................. 369/275.4
5,463,609  10/1995  Inagaki et al. ....................... 369/275.4
5,471,455  11/1995  Jabr ..................................... 369/275.4

Primary Examiner—David C. Nelms
Assistant Examiner—Kim-Kwok Chu
Attorney, Agent, or Firm—Morgan, Lewis & Bockius LLP

[57] ABSTRACT

An apparatus for reproducing information recorded on an optical recording medium comprising a substrate on which a series of pits which have depth of $2^N$ (N is an integer equal to or more than 2) steps are formed and a reflecting layer formed on the substrate to cover the series of pits. The apparatus includes a light source, a light detecting means for detecting light reflected from the optical recording medium and obtaining a read-out signal, and a level detecting circuit for detecting multiple levels corresponding to the level of the read-out signal by comparing the read-out signal with multiple level detecting windows. The width of the window is set wide at a lower signal level and the width of the window is set narrow at a higher signal level.

6 Claims, 9 Drawing Sheets

| 2 BIT HEXADECIMAL | WIDTH OF WINDOW | LEVEL |
|---|---|---|
| 00 ~ 0F<br>10 ~ 1F<br>20 ~ 2F<br>30 ~ 3F<br>40 ~ 4F<br>50 ~ 5F<br>60 ~ 6F | W1 | A |
| 70 ~ 7F<br>80 ~ 8F<br>90 ~ 9F<br>A0 ~ AF | W2 | B |
| B0 ~ BF<br>C0 ~ CF<br>D0 ~ DF | W3 | C |
| E0 ~ EF<br>F0 ~ FF | W4 | D |

APPARATUS AND METHOD FOR REPRODUCING INFORMATION RECORED ON AN OPTICAL RECORDING MEDIUM ON WHICH PITS WITH $2^N$ DEPTHS ARE FORMED

BACKGROUND OF THE INVENTION

1. Field of the Invention

The present invention relates to an apparatus and method for reproducing information recorded on an optical recording medium.

2. Description of the Related Art

As shown in FIG. 8, conventional optical disc as a recording medium comprises a transparent substrate 2 which has an information recording surface on its one side and a reflective layer 3 formed on the substrate 2. Information such as audio and/or video data is converted to pits whose length correspond to the information and recorded on the information recording surface of the disc. When the information is reproduced, a read-out beam LS is irradiated to the pits, and diffracted beam from the pits is detected by a photo detector such as a photo diode and converted to electric signal. Information is reproduced based on the electronic signal. Namely, information is reproduced by utilizing change of the amount of reflected beam from the information recording surface because of existence of the pits when the read-out beam is irradiated.

In addition, with demand for a video disc with smaller diameter and/or long recording time, several high density recording techniques have been proposed.

For example, as shown in FIG. 9(A), information is recorded in multiple level by forming the pits which have the same width and length and a plurality of steps of depth on the substrate of the disc. When the information is reproduced, the multiple level is detected by being compared with a plurality of threshold values. In this way, as each pit represents plural bit information, the recording density of the disc can be greater.

According to the method mentioned above, recording information is converted to the multiple levels in direction of depth of the disc medium. A master disc is exposed by laser beam whose intensity corresponds to the multiple level and developed. Thus, this master disc has shallow pits and deep pits depending on the recording information. However, it is difficult to unify the depth of the pits, especially shallow pits, because change in exposure time and/or developing time, and so on, cause fluctuations in depth, i.e. fluctuation of amplitude, at the process of the exposure and/or the development.

For this reason, when the optical disc produced from the master disc is reproduced, the read-out signal also fluctuates, as shown as part A in FIG. 9(B). Therefore, the error rate of information increases especially in lower level.

SUMMARY OF THE INVENTION

Accordingly, the present invention is directed to an apparatus for reproducing information recorded on an optical recording medium that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the invention, as embodied and broadly described, an apparatus for reproducing information recorded on an optical recording medium comprising a substrate on which a series of pits which have depth of $2^N$ (N is an integer equal to or more than 2) steps are formed and a reflecting layer formed on the substrate to cover the series of pits, including a light source, a light detecting means for detecting light reflected from the optical recording medium and obtaining a read-out signal, and a level detecting circuit for detecting multiple levels corresponding to the level of the read-out signal by comparing the read-out signal with multiple level detecting windows, wherein the width of the window is set wide at a lower signal level and the width of the window is set narrow at a higher signal level.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
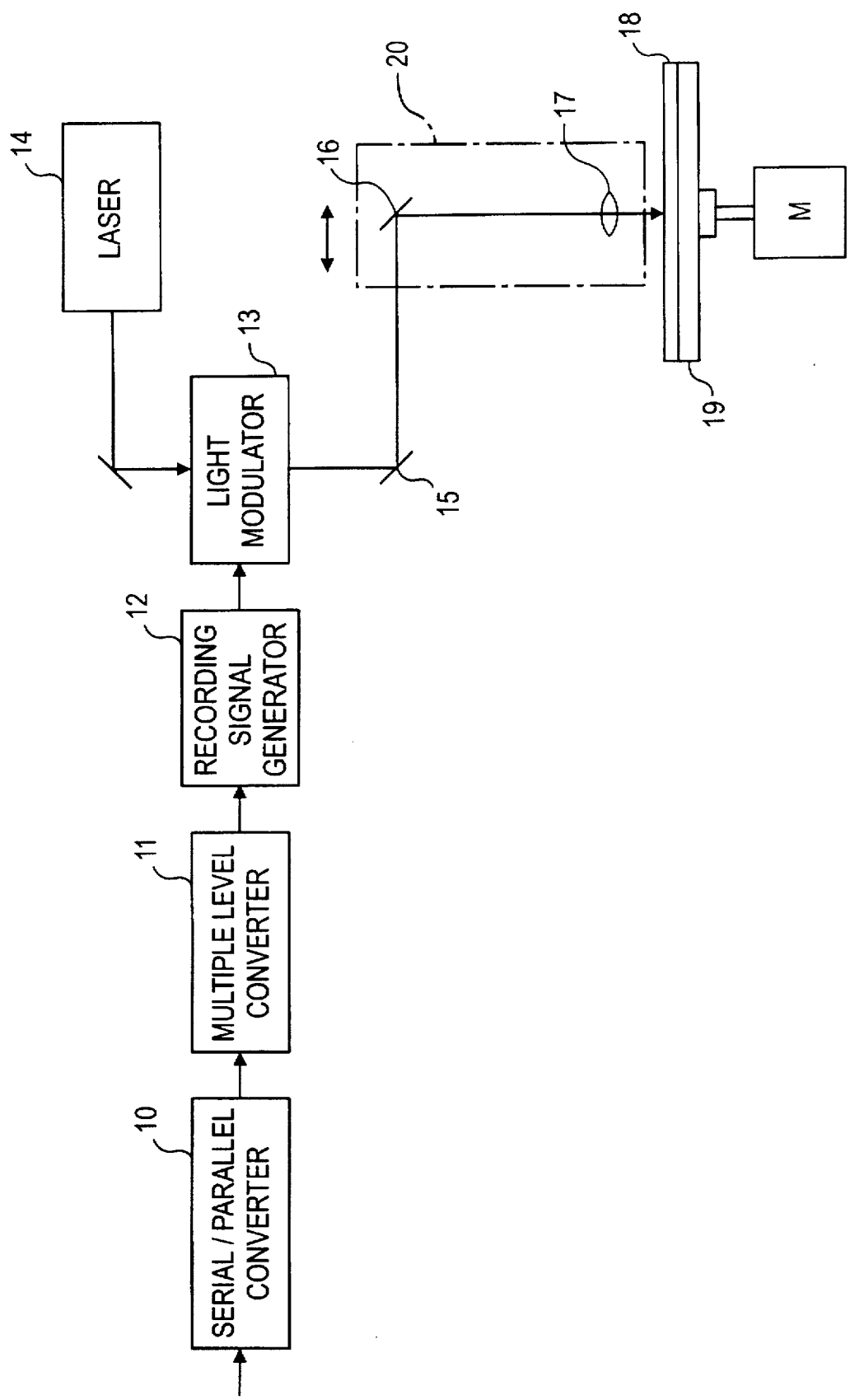
FIG. 1 is a block diagram of a recording apparatus according to a preferred embodiment of this invention.

FIG. 1 illustrates one embodiment of a recording apparatus for making a master disc according to this invention. As shown in FIG. 1, the recording apparatus has a serial/parallel converter 10, a multiple level converter 11, a recording signal generator 12, and a light modulator 13 as a controller connected to each other in that order.

The serial/parallel converter 10 converts recording data comprising a series of serial data signals which represent information such as audio, video and computer data into parallel data whose unit is N bit (N is a integer equal to or more than 2). The multiple level converter 11 converts the parallel data into code signal which has predetermined $2^N$ level. The recording signal generator 12 generates recording signal having $2^N$ level corresponding to the level of input signal from the multiple level converter 11 and provide the recording signal to the light modulator 13.

The light modulator 13 modulates the power of the beam from a laser source 14 according to the level of the recording signal provided from the recording signal generator 12 and provide recording beam controlled in $2^N$ level. The recording beam is reflected by a mirror 15 and focused by an optical system including a reflecting mirror 16 and an objective lens 17. The focused recording beam controlled $2^N$ level is radiated to an optical master disc 18 on a turntable 19. The turntable 19 rotates synchronized with the recording signal by a system controller (not shown).

The method for recording information on the optical master disc 18 by the recording apparatus mentioned above will be explained with reference to FIG. 2.

Figure 2A:
FIGS. 2(A)–2(F) are diagrams illustrating relationship between signals processed by the recording apparatus of FIG. 1 and pit formed on a disc.
Figure 2B:

First, the optical master disc 18 to be recorded is placed on the turntable 19 with its recording surface upward. When a serial data as shown in FIG. 2(A) which represent the information is provided to the serial/parallel converter 10, the serial/parallel converter 10 converts predetermined numbers of bits of the serial data, for example, every 2 bits, into parallel data and provides the parallel data to the multiple level converter 11. The 2 bit serial data takes one of four values, i.e. $2^2=4$, of (00), (01), (10), and (11). The multiple level converter 11 converts the output signal of the serial/parallel converter 10 into a code signal which represents four levels from level 0 to level 3. For example, as shown in FIG. 2(B), (00) is converted into the code signal representing level 0. Similarly, (01) is converted into the code signal representing level 1, (10) is converted into the code signal representing level 2, and (11) is converted into the code signal representing level 3.

Figure 2C:
Figure 2D:

The recording signal generator 12 generates a recording signal as shown in FIG. 2(C) which has four steps of levels corresponding to the code provided from the multiple level converter 11. The level of the recording signal is controlled so that the recording is properly carried out. The light modulator 13 receives the recording signal from the recording signal generator 12 and generates a recording beam as shown in FIG. 2(D) which has four steps of power by controlling the laser beam power in four steps corresponding to the level of the recording signal. The recording beam is focused by the objective lens of the optical system 20 and radiated on the recording surface of the optical master disc 18 to form pits. The surface of the optical master disc 18 is coated with photo-resisto, and the amount of exposure of the photo-resisto varies corresponding to the intensity of the laser beam radiated. The optical master disc 18 is exposed and the pits whose depth corresponds to the intensity of the recording beam are formed on the optical master disc 18.

Figure 2E:
Figure 2F:

As shown in FIG. 2(F), the depth of the pits is four steps corresponding to the power of the radiated beam, that is, the depth of the pit formed by the recording beam whose power corresponds to level 0 is shallowest, the depth of the pit becomes deeper as the level increases, and the depth of the pit formed by the recording beam whose power corresponds to level 3 becomes deepest. The length, width, and intervals of each pit is almost identical as shown in FIG. 2(E).

The optical master disc 18 finished in the above mentioned way is used for making a stamper. The pits having four steps of depth formed on the optical master disc 18 are transcribed on the stamper. A substrate of an optical disc as a recording medium is resin-formed with the stamper. Thus, the pits having four steps of depth formed on the optical master disc 18 is formed on the substrate of the optical disc.

Figure 3:
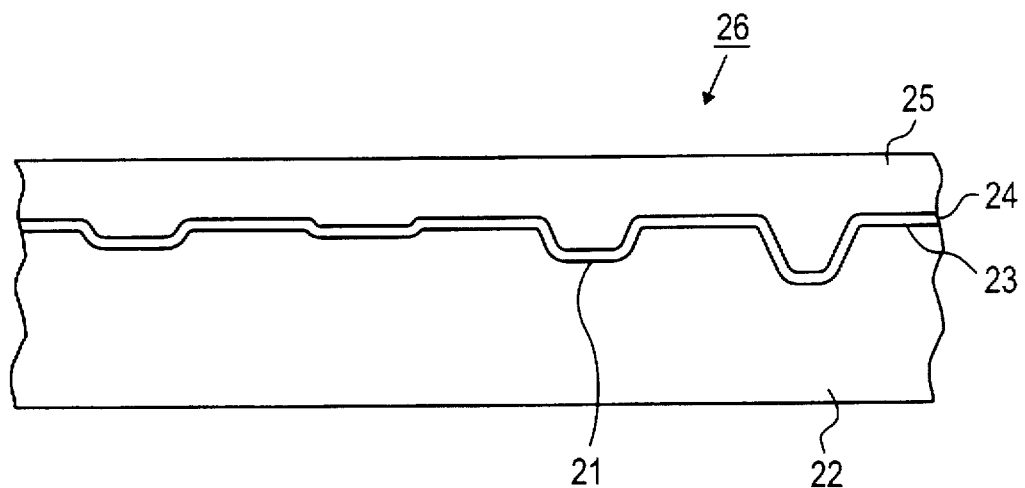
FIG. 3 is a cross section of a disc whose information is recorded and made by the recording apparatus of FIG. 1.

As shown in FIG. 3, the pits formed on the optical master disc 18 is transcribed on a surface of a transparent substrate 22 as a recording surface 23. The recording surface is covered with a reflective layer 24 and a protective layer 25, and thus, an optical disc 26 is produced.

As mentioned above, N bits data may be recorded in each pit on the optical disc 26 made by the recording apparatus by varying the depth of the pits. In the embodiment described above, serial data signal is converted into the code data signal in every 2 bits, but if the serial data is converted into the code signal in every 3 bits, the depth of pits becomes 8 steps ($2^3=8$). If the serial data is converted into the code signal in every 4 bits, 4 bits data can be recorded in each pit and the depth of pits becomes 16 steps ($2^4=16$).

The method for reproducing information by the reproducing apparatus of the present invention will be explained with reference to FIGS. 4–6.

Figure 4:
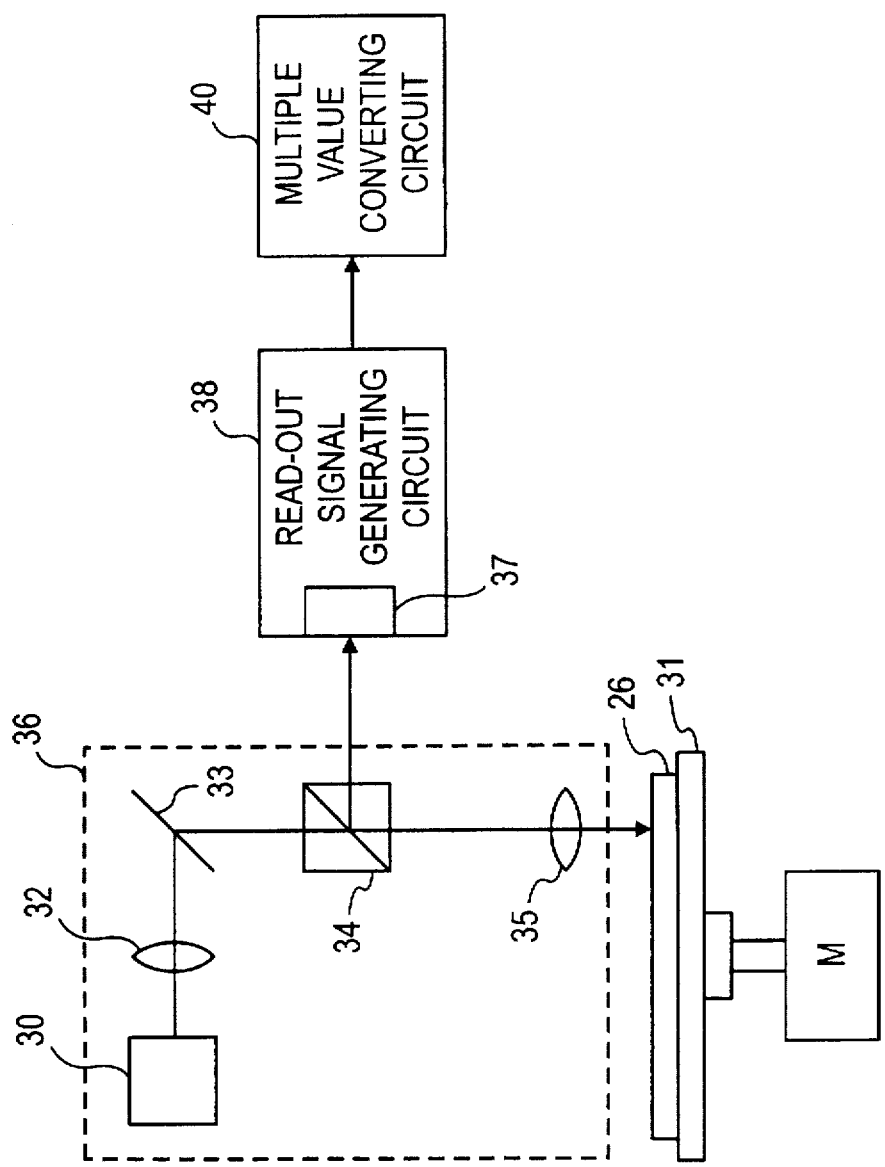
FIG. 4 is a block diagram of a reproducing apparatus according to a preferred embodiment of this invention.
Figure 5:
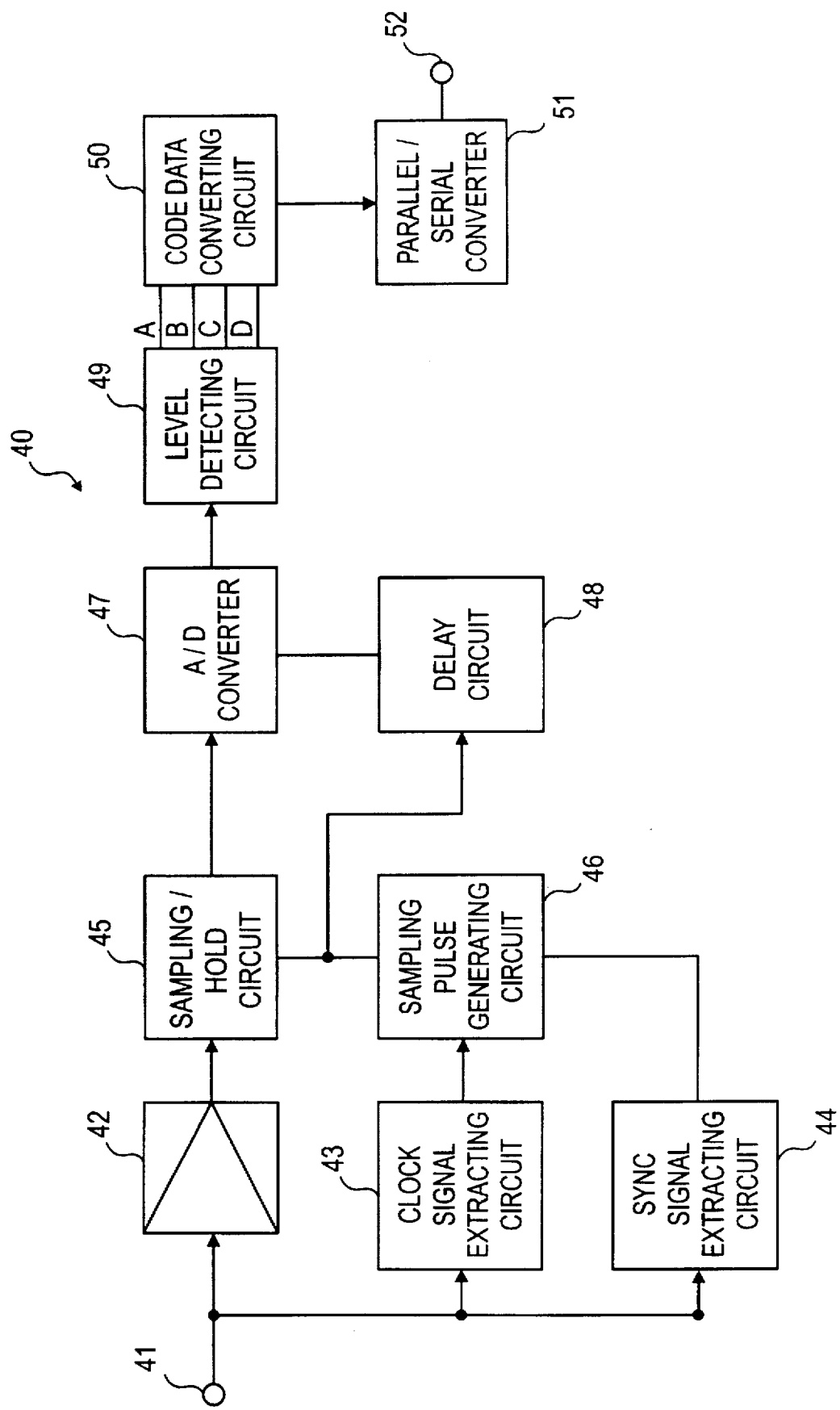
FIG. 5 is a block diagram of a multiple level converter of the reproducing apparatus of FIG. 4

FIG. 4 is a block diagram of a reproducing apparatus. The reproducing apparatus comprises an optical system 36 including a laser source 30, a turntable 31, a read-out signal generating circuit 38 which converts the reflected light from the optical disc 26 placed on the turntable 31 into electric signal, and multiple value converting circuit 40.

The laser source 30 radiates a read-out beam. The read-out beam is focused by an objective lens 35 through a lens 32, a reflective mirror 33 and a beam splitter 34 and irradiated on the optical disc 26. The reflected beam from the optical disc 26 is polarized and split by the beam splitter 34 through the objective lens 35 and transferred to the read-out signal generating circuit 38 having a photo detector 37 such as a photo diode. The output terminal of the read-out signal generating circuit 38 is connected to the multiple value converting circuit 40.

The multiple value converting circuit 40 will be described in further detail with reference to FIGS. 5–7.

Figure 6A:
FIGS. 6(A)–6(F) are diagrams illustrating relationship between pit formed on the disc and signals processed by the reproducing apparatus of FIG. 4.
Figure 6B:
Figure 6C:

An analogue signal as shown in FIG. 6(A) is provided from the read-out signal generating circuit 38 to an input terminal of the multiple value converting circuit 40. The analogue signal and digital signal, such as time code and sync signals separated and extracted by a variety of circuits mentioned later, are provided to a buffer circuit 42, a clock signal extracting circuit 43 and a sync signal extracting circuit 44 respectively. The clock signal extracting circuit 43 extracts clock signal as shown in FIG. 6(B) used for reproducing data by detecting a signal inserted in the read-out signal as a continuous repeating data pattern (known as VFO) and locking PLL (phase locked loop, not shown) in the data pattern. The sync signal extracting circuit 44 extracts a bit sync signal from the digital data. Outputs of the clock signal extracting circuit 43 and the sync signal extracting circuit 44 are respectively provided to a sampling pulse generating circuit 46 for obtaining sampling pulses as shown in FIG. 6(C) synchronized with bit signal.

The analogue signal from the read-out signal generating circuit 38 is provided to a sampling/hold circuit 45. The sampling/hold circuit 45 detects and holds the peak value of the analogue signal according to the sampling pulse. An A/D converter 47 converts the peak value into digital signal.

The sampling pulse generating circuit 46 is connected also to a delay circuit 48. The delay circuit 48 adds a delay of half of a sampling period to the output signal of the sampling pulse generating circuit 46. The delay is added for detecting the output signal of the sampling/hold circuit 45 after the level of the signal becomes stable. The A/D converter 47 provides the digital signal to a level detecting circuit 49 in timing with the output signal of the delay circuit 48. The level detecting circuit 49 determines which data area the digital signal belongs to based on windows whose width are predetermined for each level. After that, the digital data is converted into data values.

Figure 6D:
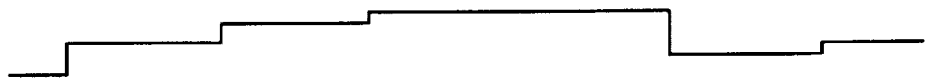
Figure 6E:
Figures 7A, 7B:
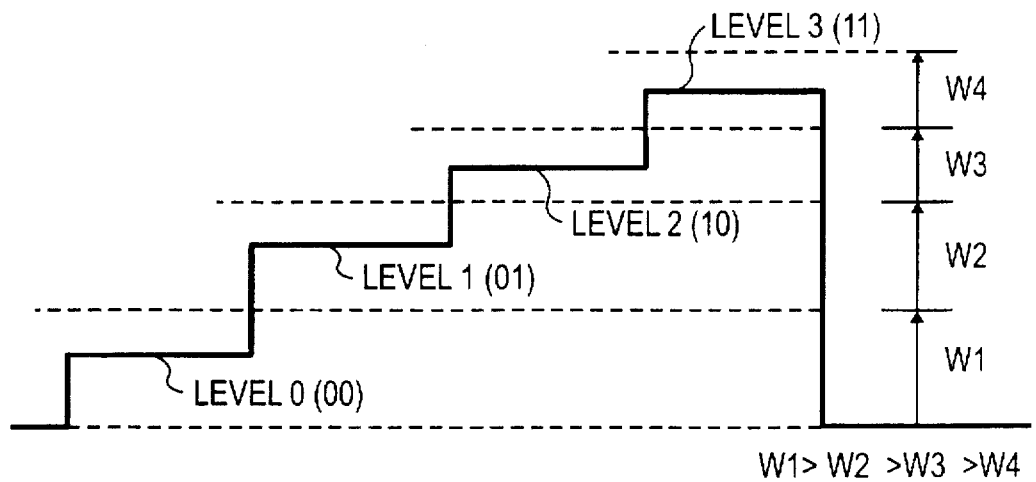
FIGS. 7(A) and 7(B) are diagrams illustrating the relationship between amplitude of signal processed by the reproducing apparatus of FIG. 4, width of window and corresponding digital data.
Figure 8:
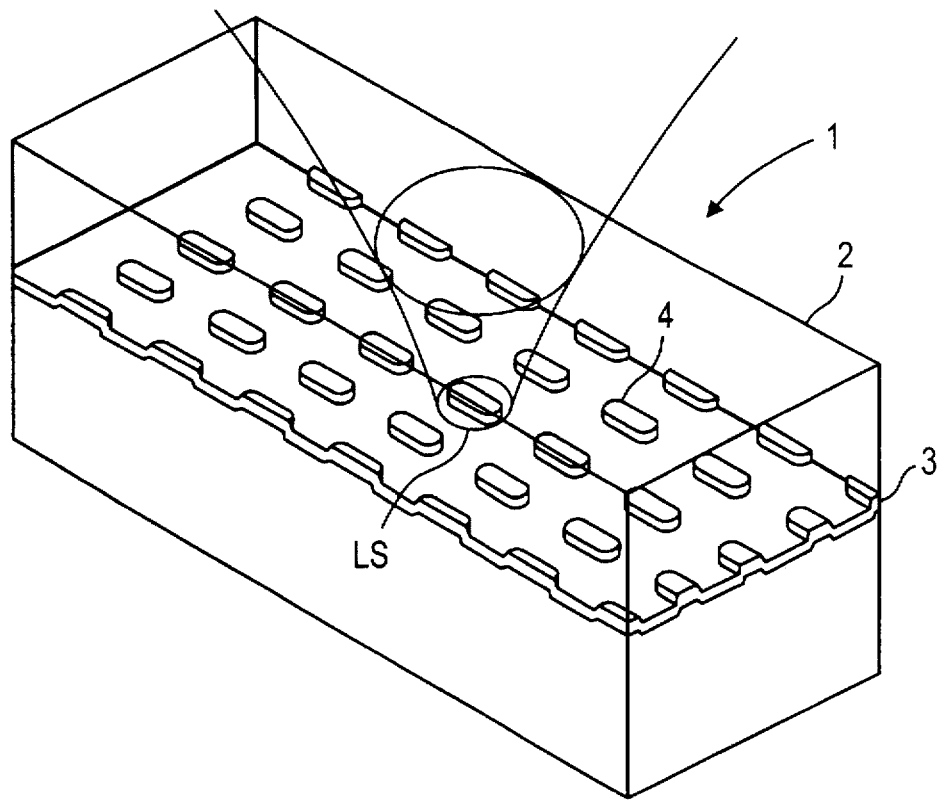
FIG. 8 is a cross section of a disc in prior art.
Figure 9A:
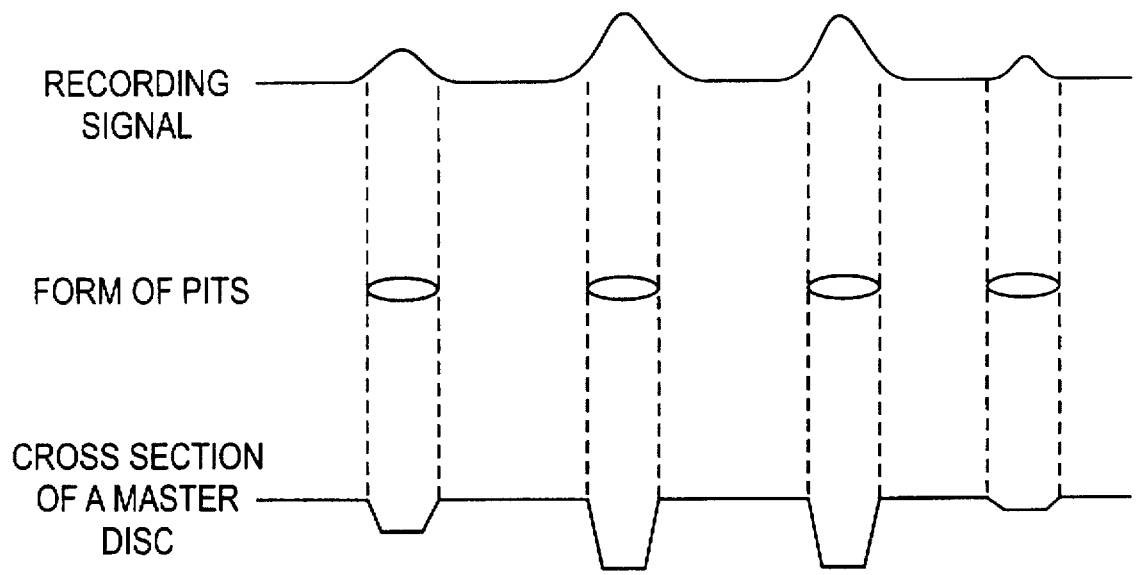
FIGS. 9(A) and 9(B) are diagrams illustrating relationships between recording signal, pit formed on a disc and a cross section of the disc in prior art.
Figure 9B:
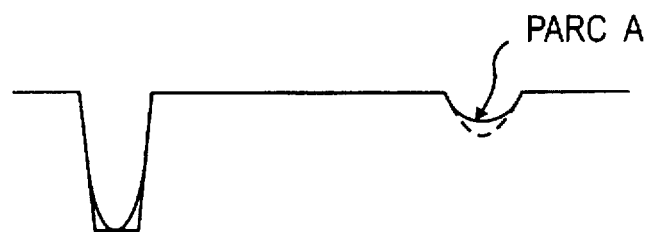

A part of FIG. 6(D) is magnified in FIG. 7(A) to show the relationship between the width of the window and corresponding digital data. As shown in FIG. 7(A), the width of window in lower signal level (W1) is set wide and the width of the window of the higher signal level (W4) is set narrow. Namely, the widths of the windows have the relationship of W1>W2>W3>W4 since low level signals are subject to errors, and as the level of the signal increases, errors become less. The level detecting circuit 49 has a plurality of threshold values corresponding to the width of the windows. For example, the level detecting circuit 49 has 2 bit hexadecimal digital value and distributes 00–6F to the data obtained within the window (W1), 70–AF to the data obtained within the window (W2), B0–DF to the data obtained within the window (W3), and E0–FF to the data obtained within the window (W4).

Figure 6F:
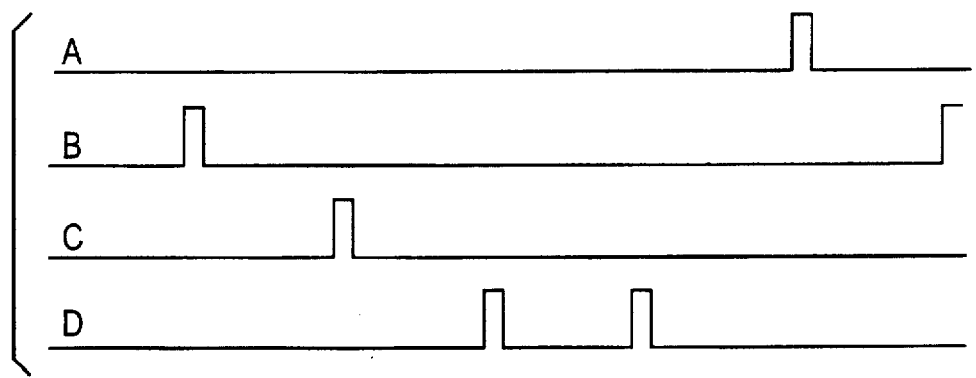

The level detecting circuit 49 provides the data obtained by the windows W1–W4 as levels A–D as shown in FIG. 6(F) to a code data converting circuit 50. Namely, as shown FIG. 7(B), any of 112 data values of 00–6F included in window (W1) becomes level A. Similarly, any of 64 data values of 70–AF included in window (W2) becomes level B, any of 48 data values of B0–DF included in window (W3) becomes level C, and any of 32 data values of E0–FF included in window (W4) becomes level D.

The code data converting circuit 50 converts the multiple value level into code data and provides the code data to an output terminal 52 through a parallel/serial converter 51.

In the embodiment described above, serial data signal is converted into the code data signals every 2 bits. If the serial data is converted into the code signal every 3 bits, the depth of pits becomes 8 steps ($2^3=8$). Similarly, if the serial data is converted into the code signal every 4 bits, 4 bits data can be recorded in each pit and the depth of pits formed on the disc becomes 16 steps ($2^4=16$). The reproducing method is applied according to the recording method.

In the embodiment described above, the level detecting circuit 49 which has different width of windows processes the signal in digital form. However, the level detecting circuit 49 may be composed of a conventional operational amplifier without converting the output of the sampling/hold circuit 45 into digital signal.

As described above, according to the present invention, the width of the window of the level detecting circuit is set wide in lower signal level and the width of the window is set narrow in the higher signal level. Thus, the multiple levels may be stably determined without being affected by the fluctuation of the level of the read-out signal even though the level of the read-out signal is low.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for reproducing information recorded on an optical recording medium comprising a substrate on which a series of pits which have depth of $2^N$ (N is an integer equal to or more than 2) steps are formed and a reflecting layer formed on the substrate to cover the series of pits, including:

a light source;

a light detecting means for detecting light reflected from the optical recording medium and obtaining a read-out signal; and a level detecting circuit for detecting multiple levels corresponding to the level of the read-out signal by comparing the read-out signal with multiple level detecting windows;

wherein the width of the window is set wide at a lower signal level and the width of the window is set narrow at a higher signal level.

2. The apparatus as claimed in claim 1, wherein the width of the window is set narrower as the signal level becomes greater.

3. The apparatus as claimed in claim 1, wherein the level detecting circuit comprises an analog to digital convertor for converting the read-out signal into a digital signal and a level detecting circuit for detecting the level of the digital signal by comparison with predetermined threshold values.

4. A method for reproducing information recorded on an optical recording medium comprising a substrate on which a series of pits which have depth of $2^N$ (N is an integer equal to or more than 2) steps are formed and a reflecting layer formed on the substrate to cover the series of pits, including the steps of:

radiating a light beam on the optical recording medium;

detecting light reflected from the optical recording medium and obtaining a read-out signal; and detecting multiple levels corresponding to the level of the read-out signal by comparing the read-out signal with multiple level detecting windows;

wherein the width of the window is set wide at a lower signal level and the width of the window is set narrow at a higher signal level.

5. The method as claimed in claim 4, wherein the width of the window is set narrower as the multiple level becomes greater.

6. The method as claimed in claim 4, wherein the step of detecting multiple levels comprises the steps of:

converting the read-out signal into a digital signal; and detecting the level of the digital signal by comparison with predetermined threshold values.

* * * * *

UNITED STATES PATENT AND TRADEMARK OFFICE
CERTIFICATE OF CORRECTION

PATENT NO. : 5,761,175
DATED : June 2, 1998
INVENTOR(S) : TAGIRI et al.

It is certified that error appears in the above-identified patent and that said Letters Patent is hereby corrected as shown below:

On the title page, and col. 1,
In Item [54], Line 2, change "RECORED" to --RECORDED--.

Signed and Sealed this

Twenty-sixth Day of January, 1999

Attest:

*Attesting Officer*   Acting Commissioner of Patents and Trademarks